United States Patent
Koshiba et al.

[11] Patent Number: 6,057,058
[45] Date of Patent: May 2, 2000

[54] ORGANIC ELECTROLYTE LITHIUM SECONDARY BATTERY

[75] Inventors: Nobuharu Koshiba, Nara Pref.; Tatsuo Mori, Ibaraki; Emi Asaka, Takatsuki; Akira Kakinuma, Osaka, all of Japan

[73] Assignee: Matsushita Electric Industrial Co., Ltd., Osaka, Japan

[21] Appl. No.: 08/886,888

[22] Filed: Jul. 2, 1997

[30] Foreign Application Priority Data

Jul. 4, 1996 [JP] Japan ..................... 8-175100

[51] Int. Cl.⁷ ............................................. H01M 4/50
[52] U.S. Cl. .................... 429/224; 429/331; 429/332; 429/333; 429/338
[58] Field of Search ....................... 429/224, 331, 429/332, 333, 338, 347

[56] References Cited

U.S. PATENT DOCUMENTS

| | | | |
|---|---|---|---|
| 5,021,308 | 6/1991 | Armand et al. | 429/338 X |
| 5,389,467 | 2/1995 | Herr et al. | 429/331 |
| 5,443,929 | 8/1995 | Yamamoto et al. | 429/330 X |
| 5,506,078 | 4/1996 | Davidson et al. | 429/333 X |
| 5,532,084 | 7/1996 | Wang et al. | 429/224 |

FOREIGN PATENT DOCUMENTS

| | | |
|---|---|---|
| 0 541 889 | 5/1993 | European Pat. Off. |
| 2 677 636 | 12/1992 | France |
| 95 05684 | 2/1995 | WIPO |

OTHER PUBLICATIONS

Patent Abstracts of Japan, vol. 096, No. 006, Jun. 28, 1996 & JP 08 031452 A (Matsuhita Electric Ind. Co., Ltd.) Feb. 2, 1996 (abstract).

Thackeray, M., et al.: "Ramsdellite–MNO2 For Lithium Batteries: The Ramsdellite To Spinel Transformation" Electrochimica Acta, vol. 38, No. 9, Jun. 1, 1993, pp. 1259–1267, XP000380769 pp. 1260–1266.

*Primary Examiner*—Stephen Kalafut
*Attorney, Agent, or Firm*—McDermott, Will & Emery

[57] ABSTRACT

The invention provides a lithium secondary battery with improved withstanding overcharge and overdischarge characteristics which employs a cathode active material of lithium-containing manganese dioxide having a crystal structure of the Ramsdellite-type. An electrolyte combined with the cathode includes $LiN(CF_3SO_2)_2$ as a solute. The solute is preferably dissolved in ethylene carbonate. A graphite or LiAl alloy is applied for an anode. LiAl alloy is corrosion-resistant, thereby improving high temperature as well as charge-discharge cycle life characteristics.

16 Claims, 1 Drawing Sheet

ORGANIC ELECTROLYTE LITHIUM SECONDARY BATTERY

BACKGROUND OF THE INVENTION

The present invention relates to a lithium secondary battery including an organic electrolyte used for a primary or back-up power source of electronic appliances.

Batteries including an organic electrolyte have a high energy density in general. With the use of such organic electrolyte batteries, therefore, it is possible to make the electronic appliances compact and light and provide them with a long storage characteristic free from a risk of leakage of electrolyte. From the above, there is an increasing demand for such organic electrolyte batteries as a primary or memory back-up power source for various electronic appliances. Main batteries used for such purpose are unchargeable primary batteries. With the remarkable development in handy electronic appliances, however, there has been a great demand currently for the secondary batteries that effectively utilize advantageous characteristics inherent to the organic electrolyte, in order to have more compact and cost-effective electronic appliances free from a burden of laborious maintenance. Under these circumstances, vigorous research and development has been made on the organic electrolyte secondary batteries. Although some of them have been put into practical use, further modification or improvement is still actively continued to have more optimal organic electrolyte secondary batteries.

Conventionally, metallic lithium or an alloy of lithium with lead or aluminum has been focused on as an anode for such organic electrolyte secondary batteries. With the advent of an anode of carbon that intercalates and deintercalates lithium, charge-discharge cycle performance of the batteries has been improved greatly. It was attempted in the Japanese Laid-Open Patent Publication Hei 2-49364 to apply a transition metal oxide for the anode. According to this prior art, the oxide stabilizes the charge-discharge cycle performance of the batteries for a long time.

On the other hand, extensive research has been made on the availability of metal oxides, such as $V_2O_5$, $Nb_2O_5$, $MnO_2$, $LiCoO_2$, $LiNiO_2$, $LiMn_2O_4$ and the like, as cathode active materials that intercalates and deintercalates lithium between crystal layers, crystal lattice positions, or lattice spaces.

Various known electrolytes include lithium salts, such as $LiClO_4$, $LiCF_3SO_3$, $LiPF_6$ and the like, and mixture solvents comprising propylene carbonate or butylene carbonate and a low viscosity solvent, such as 1,2-dimethoxyethane or dimethyl carbonate.

Various combinations of the above-mentioned anodes, cathode materials and electrolytes can give organic electrolyte lithium secondary batteries with an adequate charge-discharge cycle life. In fact, some of them are in practical use. Although some of the secondary batteries assembled from these combinations seem to have reached a substantially satisfactory level in terms of storage performance, their characteristics as a secondary battery are not enough satisfactory and further improvement in this regard has been hoped for.

BRIEF SUMMARY OF THE INVENTION

The primary object of the present invention is to provide an organic electrolyte lithium secondary battery comprising a cathode of a lithium-containing manganese oxide and an anode of lithium, a lithium alloy or a graphite which has improved charge-discharge cycle performance.

Another object of the present invention is to improve withstanding overcharge and overdischarge characteristics of the organic electrolyte lithium secondary battery.

The present invention provides an organic electrolyte lithium secondary battery comprising a cathode of a lithium-containing manganese oxide, an anode of a graphite that intercalates and deintercalates lithium, and an organic electrolyte, wherein the lithium-containing manganese oxide contains lithiated manganese dioxide having a crystal structure of the Ramsdellite-type, and the organic electrolyte comprises an organic solvent dissolving lithium perfluoromethylsulfonylimide represented by $LiN(CF_3SO_2)_2$.

Although in a preferred mode of the present invention, complete lithiated manganese dioxide having the crystal structure of the Ramsdellite-type was used as the cathode active material, mixed crystalline of various lithium-containing manganese oxides, such as $LiMn_2O_4$, $Li_2MnO_3$, $Li_{4/3}Mn_{5/3}O_4$ or the like, may also be used.

In another preferred mode of the present invention, the solvent for the organic electrolyte is an ethylene carbonate-based mixture solvent consisting of not less than two components.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
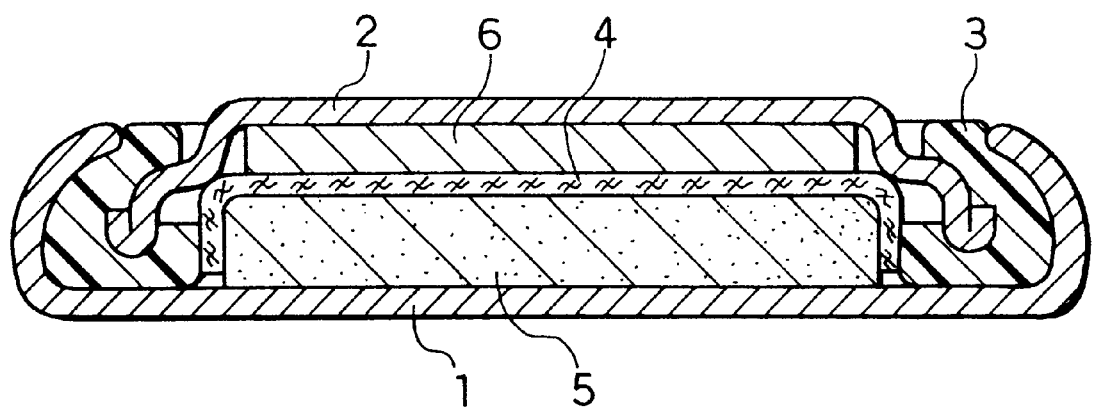
FIG. 1 is a schematic longitudinal cross-sectional view of a coin-shaped lithium secondary battery of one example in accordance with the present invention.

One example of the lithiated manganese dioxide having the crystal structure of the Ramsdellite-type is disclosed in Jap. J. Electrochemistry (Vol. 64, No. 2, 1996). Such lithiated manganese dioxide can be synthesized by a process of baking a mixture of $LiNO_3$ and $MnO_2$ at a temperature of 300 to 350° C. $Li_{1/3}MnO_2$ is one representative example, which has an X-ray powder diffraction pattern substantially overlapping that of manganese dioxide having the crystal structure of the Ramsdellite-type shown on the Joint Committee on Powder Diffraction Standards (JCPDS), Card No. 7-222. The $Li_{1/3}MnO_2$ is attractive because it has a potential of about 3 V vs. Li and a high capacity density of electricity of 180 to 200 mAh/g. This lithiated manganese dioxide, however, is rather unsatisfactory in terms of charge-discharge cycle performance, withstanding overcharge and overdischarge characteristics. In order to improve these characteristics, selection of an electrolyte compatible to this lithiated manganese dioxide is significant.

The inventors discovered that in combination with an organic electrolyte comprising an organic solvent dissolving a lithium salt $LiN(CF_3SO_2)_2$, the cathode comprising lithiated manganese dioxide having the crystal structure of the Ramsdellite-type fully exerts its advantageous characteristics. The present invention is based on this discovery.

The inventors examined various possibilities of $LiN(CF_3SO_2)_2$ as a solute for organic electrolytes. As a result, it was found that an electrolyte comprising an organic solvent dissolving this solute causes smooth movement of lithium ions induced by charge/discharge, and holds exceptional stability even when the electrolyte is exposed to a high temperature of 60° C. or applied with a voltage of about 3.5 V, but is easy to decompose if applied with a voltage of about 4 V, and becomes unstable.

Compatibility of this solute with the cathode was further examined. As a result, it was revealed that the solute has satisfactory compatibility with substances having a potential of not more than 3.5 V vs. Li, such as $LiMnO_2$, 3-V class $LiMn_2O_4$, $Li_{4/3}Mn_{5/3}O_4$, $MnO_2$, $TiS_2$, $Nb_2O_5$, $WO_3$ and $WO_2$. It was found that particularly in combination with 3-V class manganese oxides including lithiated manganese dioxide having the crystal structure of the Ramsdellite-type, the solute effectively improves the charge-discharge cycle life and withstanding overcharge characteristic at the voltage of not more than 3.5 V. The estimated reason is that the solute $LiN(CF_3SO_2)_2$ basically stands stable at a high temperature or against application of the voltage of not more than 3.5 V, and has a protective effect on unstable manganese.

The use of a mixture solvent containing ethylene carbonate comprising not less than 2 components for the organic solvent leads to effective suppression of evolution of a gas due to decomposition of the electrolyte in contact with the conductive agent carbon upon exposure to a high temperature, whereby the reliability of batteries during high temperature storage can be improved.

Carbonates, such as butylene carbonate, propylene carbonate and the like, and low viscosity organic solvents, such as ethers including 1,2-dimethoxyethane, dimethyl carbonate and the like, may be used as the solvent mixed with ethylene carbonate.

On the other hand, metallic lithium, lithium alloys, or graphite intercalating and deintercalating lithium may be applied as an anode. It is often pointed out recently that a lithium salt $LiN(CF_3SO_2)_2$ causes corrosion of Al. However, a well-known anode material, LiAl alloy, has no problem in practical use. This is because the potential causing corrosion of Al is 4 V or so vs. Li. $LiN(CF_3SO_2)_2$ rather behaves to improve the charge-discharge cycle life of the anode of LiAl alloy. In this regard, a combination of the cathode comprising lithiated manganese dioxide having the crystal structure of the Ramsdellite-type, the anode of LiAl alloy and the organic electrolyte dissolving $LiN(CF_3SO_2)_2$ is very preferable. Even if a graphite is used for the anode, $LiN(CF_3SO_2)_2$ effectively improves charge-discharge performance at a high temperature, such as 60° C. The presence of ethylene carbonate in the electrolyte prevents evolution of a gas due to decomposition of the electrolyte on the graphite caused by low potential. As a result, high reliability of the batteries during storage can be obtained.

In the following, the present invention will be described more specifically by way of concrete examples.

EXAMPLE 1

$MnO_2$ was mixed with $LiNO_3$ in a molar ratio of 3:1. The mixture was kept at 260° C. for 5 hours. Since $LiNO_3$ was molten at this stage, it could be impregnated well in $MnO_2$. Then, the resultant mixture was baked preliminarily at 300° C. for 5 hours, followed by further baking at 340° C. for another 5 hours. This gave $Li_{1/3}MnO_2$ having the crystal structure of the Ramsdellite-type. A powder of this cathode active material, carbon black as a conductive agent and an aqueous dispersion of a polyfluorocarbon resin as a binder were mixed in a weight ratio of 88:6:6 as solid contents. The resultant cathode mixture was molded to a pellet of 16 mm in diameter with a pressure of 2 tons/cm², and dried at 250° C. for 24 hours in a dry atmosphere of not more than 1% humidity, which gave a cathode of Example 1.

Separately, aluminum and lithium were molten in an argon atmosphere to make an LiAl alloy. The resultant alloy was rolled out under the same atmosphere to form a 0.3-mm thick sheet. The sheet was punched out in a disc of 15 mm in diameter, which gave an anode of Example 1.

Apart from this, prepared were a mixture solvent containing ethylene carbonate (hereafter abbreviated to "EC") and 1,2-dimethoxyethane (hereafter abbreviated to "DME") in a volumetric ratio of 1:1 (EC/DME), another mixture solvent containing EC, propylene carbonate (hereafter abbreviated to "PC") and DME in a volumetric ratio of 1:1:1 (EC/PC/DME), and still another mixture solvent containing EC, butylene carbonate (hereafter abbreviated to "BC") and DME in a volumetric ratio of 1:1:1 (EC/BC/DME). Then, various electrolytes were prepared by dissolving the solute $LiN(CF_3SO_2)_2$ in these mixture solvents at a concentration of 1 mol/l.

FIG. 1 shows a cross-sectional view of a coin-shaped lithium secondary battery assembled with the cathode and anode thus obtained. Numeral 1 designates a stainless steel battery case. A cathode 5 is provided at the central part of the case and a separator 4 made of polypropylene unwoven fabric is mounted on the cathode. Numeral 2 designates a stainless steel sealing plate. The sealing plate is installed with an anode 6 made of a lithium-aluminum alloy on the medial side and provided with an insulating packing 3 made of polypropylene in the periphery. After the battery case 1 and the sealing plate 2 were filled with an electrolyte, they were combined together and assembled in a sealed battery. The sealed battery thus prepared has a diameter of 20.0 mm and a thickness of 2.0 mm.

Batteries comprising electrolytes containing organic mixture solvents of EC/DME, EC/PC/DME and EC/BC/DME are named "A", "B" and "C", respectively. The battery using the electrolyte prepared by dissolving $LiN(CF_3SO_2)_2$ in PC/DME (1:1 in a volumetric ratio) at a concentration of 1 mol/l is named "D". Similarly, those using the electrolytes prepared by dissolving $LiPF_6$ in EC/DME (1:1 in a volumetric ratio) or $LiCF_3SO_3$ in EC/DME (1:1 in a volumetric ratio) at a concentration of 1 mol/l are named "E" and "F", respectively.

EXAMPLE 2

A graphite powder and a binder of an aqueous dispersion of the polyfluorocarbon resin were mixed in a weight ratio of 95:5 (as solid contents). The mixture was dried and molded to a pellet of 0.3 mm in thickness and 15 mm in diameter. The pellet was bonded with metallic lithium and immersed in the below-mentioned organic electrolyte to cause the pellet to absorb lithium. This gave an anode. Apart from this, an electrolyte was prepared by dissolving $LiN(CF_3SO_2)_2$ in a mixture solvent EC/DME (1:1 in a volumetric ratio) at a concentration of 1 mol/l. Then, a battery "G" of Example 2 was prepared in the same manner as described in Example 1, except for the use of the electrolyte prepared here.

For comparison, an additional battery "H" was prepared in the same manner as described in Example 2, except that $LiPF_6$ was used as a solute for the electrolyte.

EXAMPLE 3

LiOH was mixed with $MnO_2$ in a molar ratio of 1:1. The mixture was heated at 600° C. for 5 hours to synthesize $LiMn_2O_4$. The $LiMn_2O_4$ thus obtained was mixed with $Li_{1/3}MnO_2$ prepared in Example 1 in a molar ratio of 1:1. Then, a battery "I" of Example 3 was prepared in the same manner as described in Example 1, except that the mixture thus obtained was used as the cathode active material and the electrolyte prepared by dissolving $LiN(CF_3SO_2)_2$ in the mixture solvent EC/DME (1:1 in a volumetric ratio) at a concentration of 1 mol/l.

For comparison, an additional battery "J" was prepared in the same manner as described in Example 3, except that $LiPF_6$ was used as a solute for the electrolyte.

EXAMPLE 4

LiOH was mixed with $MnO_2$ in a molar ratio of 0.8:1. The mixture was heated at 450° C. for 5 hours to synthesize $Li_{4/3}Mn_{5/3}O_4$. The $Li_{4/3}Mn_{5/3}O_4$ thus obtained was mixed with $Li_{1/3}MnO_2$ prepared in Example 1 in a molar ratio of 1:1. Then, a battery "K" of Example 4 was prepared in the same manner as described in Example 1, except that the mixture thus obtained was used as the cathode active material and the electrolyte prepared by dissolving LiN $(CF_3SO_2)_2$ in the mixture solvent EC/DME (1:1 in a volumetric ratio) at a concentration of 1 mol/l was used as the electrolyte.

For comparison, an additional battery "L" was prepared in the same manner as described in Example 4, except that $LiPF_6$ was used as a solute for the electrolyte.

Batteries "A" to "F" of Example 1 were subjected to charge-discharge cycle life test, overcharge test at a constant voltage, and overdischarge test.

The charge-discharge cycle life test was performed at 20° C. with a constant current of 1 mA by setting the upper limit of cutoff charge voltage at 3.3 V and the lower limit of cutoff discharge voltage at 2 V. The test was repeated 30 cycles. Table 1 lists the maintenance rate of electric capacity after 30 cycles, calculated by defining the initial electric capacity as 100.

TABLE 1

| Battery | Maintenance rate of electric capacity after 30 cycles (%) |
|---|---|
| A | 85 |
| B | 88 |
| C | 83 |
| D | 76 |
| E | 70 |
| F | 40 |

All the batteries "A", "B", and "C" substantially maintained more than 80% of the initial electric capacity after 30 cycles. Although slightly poor, the battery "D" using the electrolyte without EC also maintained an electric capacity close to 80% of the initial electric capacity. The battery "E" using the electrolyte containing the solute $LiPF_6$ shows a relatively satisfactory percentage of 70%. By contrast, the battery "F" using the electrolyte containing the solute $LiCF_3SO_3$ shows a very low percentage of 40%.

These results indicate that the electrolyte containing the solute $LiN(CF_3SO_2)_2$ effectively improves the charge-discharge cycle life. Although the effect was slight, the electrolyte containing EC as the organic solvent was also found to improve the cycle life. By contrast, it was noted that the effect of the electrolyte containing the solute $LiCF_3SO_3$ is very poor.

Next, the cycle life test was performed at 60° C. under the same charge-discharge conditions as applied above. The results are shown in Table 2.

After 30 cycles, while all the batteries "A", "B", and "C" show an electric capacity of more than 80% of the initial value, the percentage is 60% with the battery "D" and less than 40% with the batteries "E" and "F". These data indicate that while the solute $LiN(CF_3SO_2)_2$ effectively improves the charge-discharge cycle life at a high temperature and the solvent EC behaves to stabilize this effect, the solute $LiPF_6$ is affected much by repeated charge-discharge at a high temperature.

TABLE 2

| Battery | Maintenance rate of electric capacity after 30 cycles (%) |
|---|---|
| A | 83 |
| B | 85 |
| C | 81 |
| D | 60 |
| E | 36 |
| F | 33 |

Next, the results of the overcharge test will be described. The test was performed in a high temperature atmosphere at 60° C. while applying a constant voltage of 3.3 V over a period of continuous 60 days. Internal resistance after the test was measured at 1 KHz by an AC impedance method. The electric capacity down to a cutoff voltage of 2 V was also measured at the constant discharge current of 1 mA. Table 3 lists changes in internal resistance and maintenance rate of electric capacity, calculated by defining the respective initial values prior to the test as 100.

TABLE 3

| Battery | Change in internal resistance (%) | Maintenance rate of electric capacity (%) |
|---|---|---|
| A | 102 | 98 |
| B | 104 | 99 |
| C | 105 | 96 |
| D | 120 | 90 |
| E | 1200 | 0 |
| F | 122 | 90 |

With respect to the internal resistance, the results show that the batteries "A", "B", and "C" substantially maintained the initial value. The battery "D" free from the organic solvent EC shows a 20% increase and the battery "E" using the electrolyte containing the solute $LiPF_6$ shows more than a ten-fold increase, compared with the initial value. Whereas, the battery "F" using the electrolyte containing $LiCF_3SO_3$ as the solute shows about a 20% increase.

With respect to the electric capacity, the results show that the batteries "A", "B", and "C" maintained about 100% of the initial value. The batteries "D" and "F" maintained about 90%, and the battery "E" 0%.

These results indicate that the electrolyte comprising $LiN(CF_3SO_2)_2$ as the solute is very effective for improving the withstanding overcharge characteristic of the batteries. Even better improvement can be obtained by the combined use of the organic solvent EC.

Next, the results of the overdischarge test will be described. The batteries tested were first loaded with 3 kΩ and kept in situ for consecutive 30 days. After continuous discharge while loading 3 kΩ for one day plus, the terminal voltage of the batteries dropped to around 0 V. The batteries were then left in situ for 30 days. After the test, the internal resistance of each battery was measured at 1 kHz by the AC impedance method. Separately, the batteries were charged at a constant voltage of 3.3 V, and then their electric capacity was measured with a constant current of 1 mA down to the cutoff voltage of 2 V. Table 4 lists changes in internal resistance and the recovery of electric capacity, calculated by defining the respective initial values prior to the test as 100.

TABLE 4

| Battery | Change in internal resistance (%) | Recovery of electric capacity (%) |
| --- | --- | --- |
| A | 102 | 97 |
| B | 103 | 98 |
| C | 106 | 96 |
| D | 106 | 95 |
| E | 210 | 70 |
| F | 121 | 95 |

With respect to the internal resistance, the initial value was substantially retained after the test in the batteries "A", "B", "C", and "D". The battery "E" showed about a two-fold increase and the battery "F" about a 20% increase, compared with the initial value.

As to the electric capacity, the initial value was substantially retained after the test in the batteries "A" to "D" and "F". In the battery "E", however, the electric capacity decreased to 70%, compared with the initial value.

These results indicate that the batteries including LiN(CF$_3$SO$_2$)$_2$ or LiCF$_3$SO$_3$ stood stable against the overdischarge load. Whereas, the battery including LiPF$_6$ shows a slightly large decrease after the discharge test. This may be because the solute LiPF$_6$ is easy to decompose.

Next, the batteries "G" and "H" were subjected to the charge-discharge cycle life test at a high temperature of 60° C. under the same charge-discharge conditions as applied above. Table 5 lists the maintenance rate of electric capacity after 100 cycles.

The battery "G" of Example 2 in accordance with the present invention maintained 80% of the initial value after 100 cycles. Whereas, the battery "H" of the comparative example using the electrolyte containing LiPF$_6$ as the solute showed a significant decrease to 50%. These data may result from the facts that the electrolyte comprising the combination of the solute LiN(CF$_3$SO$_2$)$_2$ and the organic solvent EC was stable also in the battery "G" of Example 2, and that the electrolyte including LiPF$_6$ was unstable at a high temperature.

TABLE 5

| Battery | Maintenance rate of electric capacity after 100 cycles (%) |
| --- | --- |
| G | 80 |
| H | 50 |

Similarly, the batteries "I" to "L" were subjected to the charge-discharge cycle life test at a high temperature of 60° C. under the same charge-discharge conditions as applied above. Table 6 lists the results of the maintenance rate of electric capacity after 30 cycles.

The batteries "I" and "K" of Examples 3 and 4 in accordance with the present invention maintained about 80% of the initial value after 30 cycles. The batteries "J" and "L" of the comparative examples using the electrolyte including LiPF$_6$ as the solute showed a large decrease in the order of 30% of the initial value. The estimated reason for this is that, as stated above, the combination of the solute LiN(CF$_3$SO$_2$)$_2$ and the organic solvent EC is stable against the charge-discharge load also in the batteries of Examples 3 and 4, and that the solute LiPF$_6$ is unstable at a high temperature.

TABLE 6

| Battery | Maintenance rate of electric capacity after 30 cycles (%) |
| --- | --- |
| I | 78 |
| J | 34 |
| K | 81 |
| L | 35 |

In the foregoing examples, although almost pure lithiated manganese dioxide having the crystal structure of the Ramsdellite-type was used singly or in combination with LiMn$_2$O$_4$ or Li$_{4/3}$Mn$_{5/3}$O$_4$ as the cathode active materials, mixed crystalline of these lithiated manganese oxides may also be used. Similar effects may also be obtained from other cathode active materials, such as mixtures or mixed crystalline of LiMnO$_2$ and substances, for instance, V$_2$O$_5$, V$_6$O$_{13}$ and the like, other than manganese.

As discussed above, the present invention can provide a highly reliable organic electrolyte lithium secondary battery under severe overcharge-overdischarge conditions that maintains an exceptional electric capacity and manifests excellent charge-discharge cycle life and high temperature characteristics.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An organic electrolyte lithium secondary battery comprising:
   a cathode made of a lithium-containing manganese oxide,
   an anode made of metallic lithium, a lithium alloy or graphite, and
   an organic electrolyte,
   wherein
   said lithium-containing manganese oxide contains lithiated manganese dioxide having a crystal structure of the Ramsdellite-type and LiMn$_2$O$_4$, and
   said organic electrolyte comprises an organic solvent and dissolved LiN(CF$_3$SO$_2$)$_2$.

2. The organic electrolyte lithium secondary battery in accordance with claim 1,
   wherein said organic solvent is an organic solvent mixture comprising ethylene carbonate.

3. The organic electrolyte lithium secondary battery in accordance with claim 2,
   wherein said organic solvent is an organic solvent mixture comprising at least two (2) carbonates including ethylene carbonate.

4. The organic electrolyte lithium secondary battery in accordance with claim 2,
wherein said organic solvent is an organic solvent mixture comprising ethylene carbonate and at least one selected from the group consisting of propylene carbonate, butylene carbonate, 1,2-dimethoxyethane, and dimethyl carbonate.

5. An organic electrolyte lithium secondary battery comprising:
a cathode made of a manganese oxide including lithium-containing manganese dioxide having a crystal structure of the Ramsdellite-type and $LiMn_2O_4$,
an anode made of graphite, and
an organic electrolyte comprising $LiN(CF_3SO_2)_2$ and ethylene carbonate.

6. The organic electrolyte lithium secondary battery in accordance with claim 5, wherein said organic electrolyte further comprises at least one selected from the group consisting of propylene carbonate, butylene carbonate, 1,2-dimethoxyethane, and dimethyl carbonate.

7. An organic electrolyte lithium secondary battery comprising:
a cathode made of a manganese oxide including lithium-containing manganese dioxide having a crystal structure of the Ramsdellite-type and $LiMn_2O_4$,
an anode made of a lithium-aluminum alloy, and
an organic electrolyte comprising $LiN(CF_3SO_2)_2$ and ethylene carbonate.

8. The organic electrolyte lithium secondary battery in accordance with claim 7, wherein said organic electrolyte further comprises at least one selected from the group consisting of propylene carbonate, butylene carbonate, 1,2-dimethoxyethane, and dimethyl carbonate.

9. An organic electrolyte lithium secondary battery comprising:
a cathode made of a lithium-containing manganese oxide,
an anode made of metallic lithium, a lithium alloy or graphite, and
an organic electrolyte,
wherein
said lithium-containing manganese oxide contains lithiated manganese dioxide having a crystal structure of the Ramsdellite-type and $Li_{4/3}Mn_{5/3}O_4$, and said organic electrolyte comprises an organic solvent and dissolved $LiN(CF_3SO_2)_2$.

10. The organic electrolyte lithium secondary battery in accordance with claim 9, wherein said organic solvent is an organic mixture solvent comprising ethylene carbonate.

11. The organic electrolyte lithium secondary battery in accordance with claim 9, wherein said organic mixture solvent comprises at least two carbonates including ethylene carbonate.

12. The organic electrolyte lithium secondary battery in accordance with claim 11, wherein said organic mixture solvent comprises ethylene carbonate and at least one selected from the group consisting of propylene carbonate.

13. An organic electrolyte lithium secondary battery comprising:
a cathode made of a manganese oxide including lithium-containing manganese dioxide having a crystal structure of the Ramsdellite-type and $Li_{4/3}Mn_{5/3}O_4$,
an anode made of graphite, and
an organic electrolyte comprising $LiN(CF_3SO_2)_2$ and ethylene carbonate.

14. The organic electrolyte lithium secondary battery in accordance with claim 13, wherein said electrolyte further comprises at least one selected from the group consisting of propylene carbonate, butylene carbonate, 1,2-dimethoxyethane, and dimethyl carbonate.

15. An organic electrolyte lithium secondary battery comprising:
a cathode made of a manganese oxide including lithium-containing manganese dioxide having a crystal structure of the Ramsdellite-type and $Li_{4/3}Mn_{5/3}O_4$,
an anode made of a lithium-aluminum alloy, and
an organic electrolyte comprising $LiN(CF_3SO_2)_2$ and ethylene carbonate.

16. The organic electrolyte lithium secondary battery in accordance with claim 15, wherein said electrolyte further comprises at least one selected from the group consisting of propylene carbonate, butylene carbonate, 1,2-dimethoxyethane, and dimethyl carbonate.

* * * * *